J. E. GASTON & O. C. HOOD.
FERTILIZER SOWER.
APPLICATION FILED MAR. 23, 1912.
1,125,508.
Patented Jan. 19, 1915.
2 SHEETS—SHEET 2.
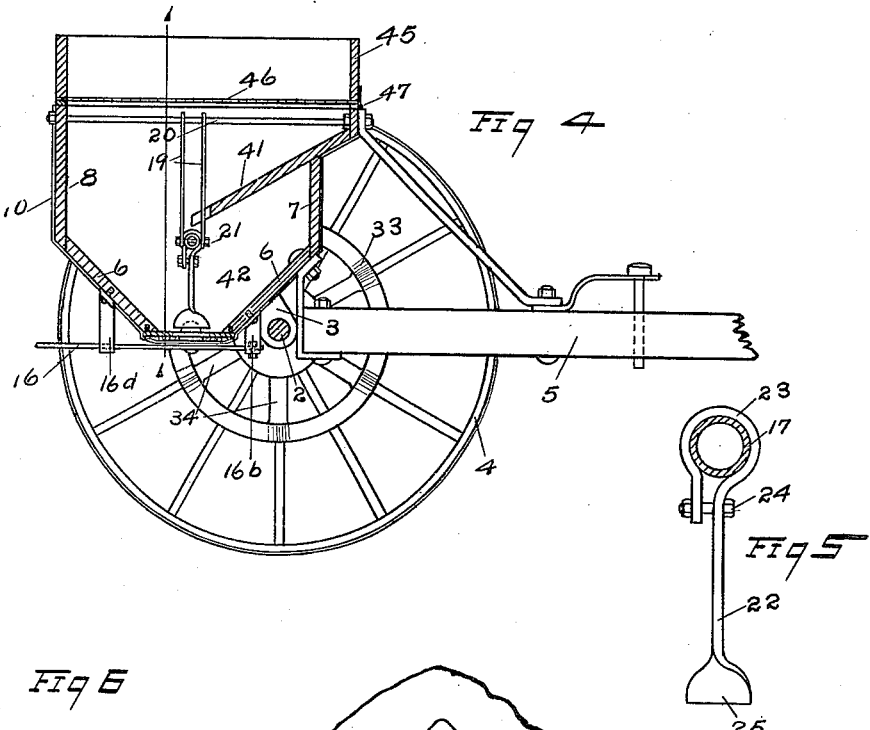
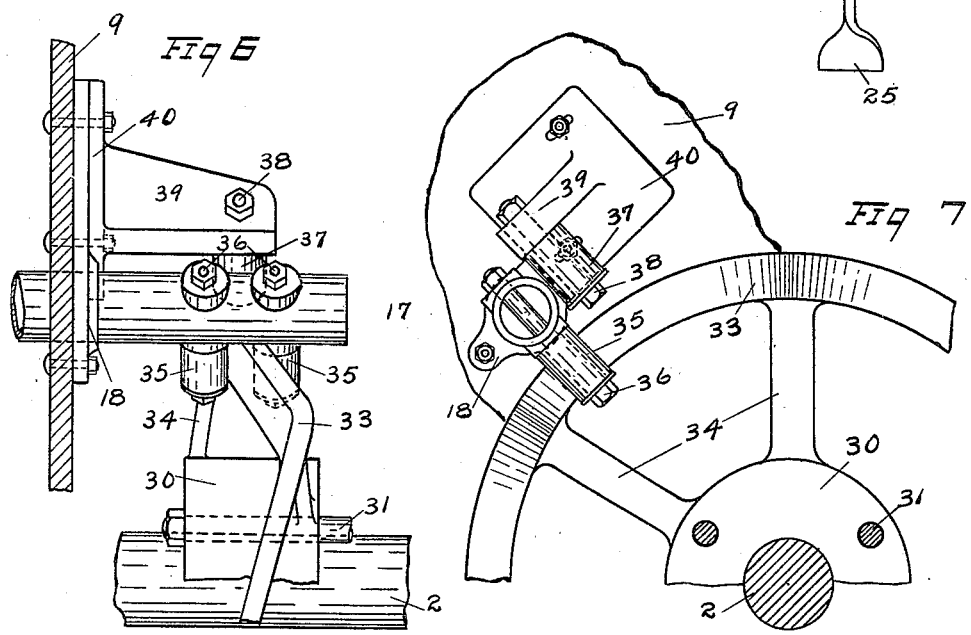

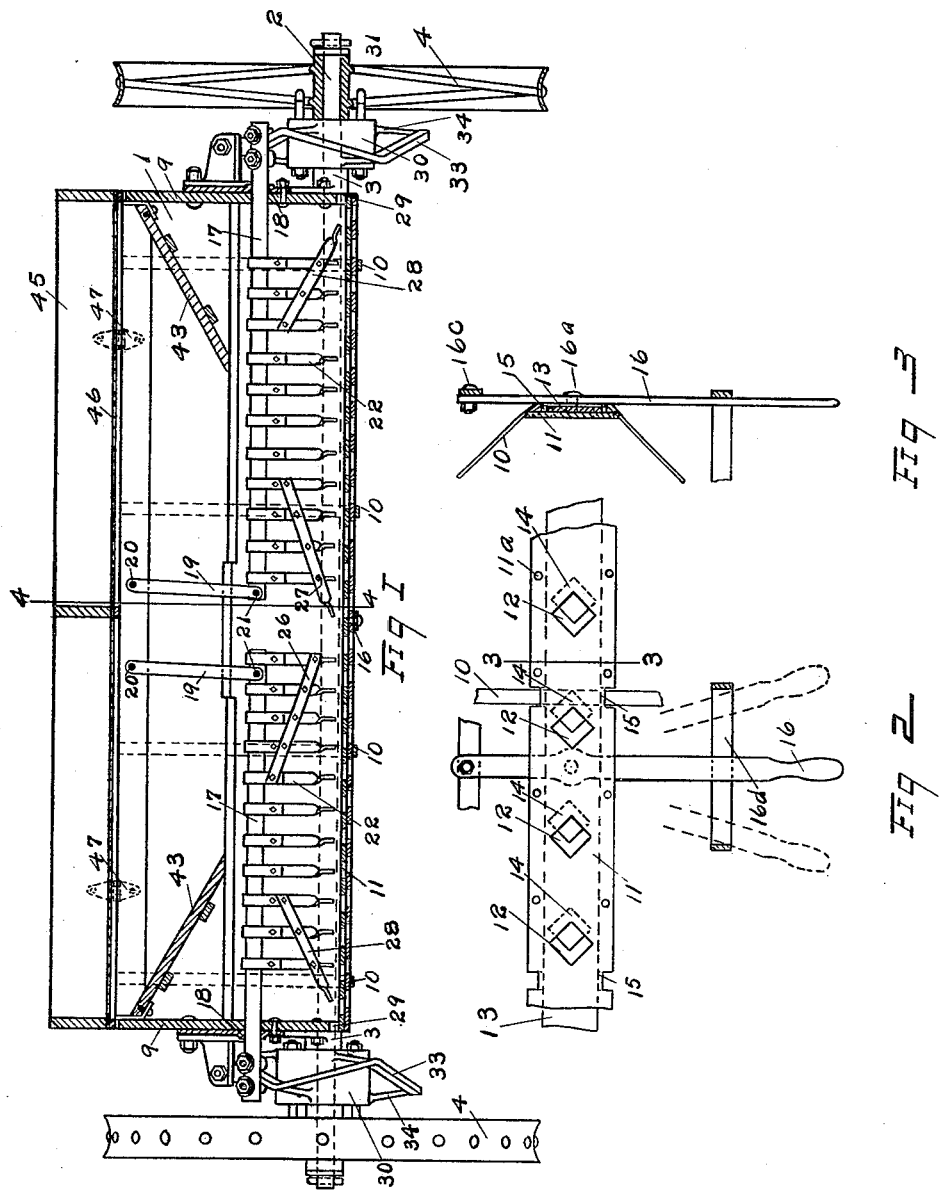

UNITED STATES PATENT OFFICE.

JAMES E. GASTON AND OSCAR C. HOOD, OF COCHRANTON, PENNSYLVANIA, ASSIGNORS TO A. B. GASTON COMPANY, OF COCHRANTON, PENNSYLVANIA, A CORPORATION OF PENNSYLVANIA.

FERTILIZER-SOWER.

1,125,508.  Specification of Letters Patent.  Patented Jan. 19, 1915.

Application filed March 23, 1912. Serial No. 685,855.

*To all whom it may concern:*

Be it known that we, JAMES E. GASTON and OSCAR C. HOOD, citizens of the United States, residing at Cochranton, in the county of Crawford and State of Pennsylvania, have invented new and useful Improvements in Fertilizer-Sowers, of which the following is a specification.

This invention relates to fertilizer sowers and consists in certain improvements in the construction thereof as will be hereinafter fully described and pointed out in the claims.

The invention is illustrated in the accompanying drawings as follows:—

Figure 1 shows a section on the line 1—1 in Fig. 4. Fig. 2 an enlarged plan view of the feed plates. Fig. 3 a section on the line 3—3 in Fig. 2. Fig. 4 a section on the line 4—4 in Fig. 1. Fig. 5 an enlarged view of some of the agitator teeth. Fig. 6 an enlarged elevation of the supports and driving mechanism for the agitator rod. Fig. 7 an end elevation of the same parts.

1 marks the box, 2 the axle, 3 the brackets by means of which the box is secured to the axle, 4 the supporting and driving wheels and 5 the tongue.

The box has the hopper bottom formed by the slanting sides 6—6, the front vertical board 7 and the rear vertical board 8. These boards are secured to the end boards 9. The box is also braced by the continuous straps 10 which extend from the rear around the bottom to the front (see Fig. 4). The feed plate 11 is secured to the bottoms of the hopper bottom sides 6 by means of screws, the feed plate being perforated at 11ª for this purpose. The feed plate has a series of square openings 12. The controlling plate 13 is arranged under the feed plate. It is provided with a series of square openings 14 which are adapted to be brought into complete register with the openings 12 for the maximum feed and to be moved from this position sidewise to decrease the feed as clearly shown in Fig. 2.

The form of the openings through the plates is one of the features of this invention. It will be noted that by using the square openings and making the diagonals of the openings lengthwise of the plates that as the controlling plate 13 is moved to adjust the openings the openings while being decreased in size will at all times maintain the square shape. This is important in that the feed may be materially reduced and still the openings maintained of a shape that will permit of small lumps of material passing through the openings. Where the openings are such that their shapes are changed as the size is reduced a comparatively large feed will leave the openings of such small dimensions in one direction as to obstruct the ready passage of such lumps or particles.

In order to guide the controlling plate 13, the plate 11 has the ears 15 struck up on it forming side guides for the plate 13. The straps 10 extend around the bottom forming a bottom support for the plate 13 and the ear 15 forms a distance piece preventing the straps from binding the plate 13. A lever 16 is pivotally secured at 16ª to the plate 13. The lever is fulcrumed on a bracket 16ᵇ extending downwardly from the box by means of the bolt 16ᶜ. The rear end of the lever passes through a loop 16ᵈ which supports the lever. This positions the lever so that it may be conveniently operated to adjust the feed.

The agitator is arranged to reciprocate over the feed plate so as to assure a constant feeding of the fertilizer through the plate. The agitator comprises the agitator rods 17, the outer ends of which extend through the openings in brackets 18 secured to the end of the box. The inner ends of the rods 17 are mounted on links 19, the links being pivotally mounted on the rods 20 at the top, the rods 20 extending across from the sides of the box. The links 19 are secured to the rods 17 by means of the bolts 21 which extend through the rods 17. In this way, the rods 17 are locked against turning. The agitator teeth 22 have the loops 23 at their upper ends which extend around the rods 17. The teeth are clamped on the rods by means of the bolts 24 which extend through the free end of the loop 23 and the tooth. The teeth are preferably formed of flat bars and the lower ends are twisted so as to give to the bottom end a face 25. The inner end of one of the agitators is braced by means of the bar 26 which extends diagonally across the teeth. The end of the opposite agitator is braced by the bar 27 which extends beyond the end teeth forming an agitator for the center of the machine. Diagonal teeth 28 are secured to the end bars and form an agitator for the end of the box.

It will be noted that the link mounting at the inner end of the agitator rods 17 give to these rods a movement slightly toward and from the feed plate. This slight to and from movement facilitates the feed in that it tends to force some of the material which would otherwise clog in the box through the openings. Great difficulty is experienced with these devices in the banking up or clogging of the material and in order to prevent clogging of material at the ends of the box thus blocking the machine, we provide the openings 29 in the ends of the box. These openings permit of the outward feeding of a small amount of material with each reciprocation of the agitator and consequently prevent the banking up of the material in the end and bottom corners of the box. This end feeding, we have found to be very important with some classes of fertilizers.

The mechanism for driving the agitators is as follows:—A cam wheel having the hub 30 is secured to the wheel 4 by means of the hook bolts 31 which are passed through perforations in the hub 30 and hooked on the spokes of the wheel 4. In this way, these cam wheels are clamped to the wheels of the machine and driven with them. They are provided with the cam rims 33 which are connected with the hubs 30 by means of the spokes 34, as shown. The cams are arranged to give three vibrations to the agitators with each rotation of the wheel. Rollers 35 are secured at the ends of the rods 17 by means of the shoulder bolts 36. There is one of these rollers at each side of each rim 33 so that the rods are driven in both directions through the engagement of these rollers with the rim. In order to prevent any binding in the opening in the plate 18, we prefer to provide the rollers 37 to take up the thrust of the cam on the rods 17. The rollers 37 are mounted on the shoulder bolts 38. The shoulder bolts 38 are secured to lugs 39 on the plates 40, the plates 40 being secured to the ends 9 of the box.

As before stated, there is great difficulty in these machines by reason of the arching or clogging of the material in the box. To obviate the arching of the material through the body of the box, we provide the board 41 which extends from the front of the box to a position over the agitator. This leaves a space 42 ordinarily practically free of material, and thus the material is presented as it were sidewise to the agitators and the banking of material over or through the agitators is prevented in that the bulk of the material is kept out of the space 42. End boards 43 extending inwardly from the ends are provided for the same purpose to prevent the banking or arching at the ends. A screen box 45 is mounted on the box. It is provided with the screen 46 which extends throughout the bottom of the screen box. The screen is secured to the screen box by the hinges 47. In this way, the screen box can be thrown over so as to empty the screens quickly and without detaching from the main box.

What we claim as new is:—

1. In a fertilizer sower, the combination of a box having feed openings in the bottom thereof and an opening at the bottom end corner; an agitator operating over said openings and adjacent to the end opening; and means for actuating the agitator.

2. In a fertilizer sower, the combination of a box having feed openings in the bottom thereof and an opening at the bottom end corner; a reciprocating agitator operating over said openings and adjacent to the end opening; and means for actuating the agitator.

3. In a fertilizer sower, the combination of a box having feed openings in the bottom thereof; an agitator formed of a rod extending longitudinally into the box; teeth extending downwardly from said rod; and a bar extending across said teeth and projecting therefrom to form the end tooth for the agitator.

4. In a fertilizer sower, the combination of a box having feed openings in the bottom thereof and an opening at the bottom end corner; an agitator formed of a rod extending longitudinally into the box; teeth extending downwardly from said rod; and a bar extending across said teeth and projecting therefrom to form the end tooth for the agitator and operating adjacent to the opening in the end of the box.

5. In a fertilizer sower, the combination of a box having feed openings in the bottom thereof; two agitators formed with rods extending inwardly from the end of the box and operating over said openings; wheels at each end of the box supporting the box; and means driven by said wheels for actuating said agitators independently.

6. In a fertilizer sower, the combination of a box; a centrally located agitator; a board extending from the side of the box to said agitator forming a space at one side of the agitator protected by the board from a direct weight of material in the box; and boards extending from the ends inwardly to protect the material from the ends.

In testimony whereof we have hereunto set our hands in the presence of two subscribing witnesses.

JAMES E. GASTON.
OSCAR C. HOOD.

Witnesses:
IVAN E. PRATT,
KATE G. GASTON.

Copies of this patent may be obtained for five cents each, by addressing the "Commissioner of Patents, Washington, D. C."